(12) United States Patent
Fiedler et al.

(10) Patent No.: US 9,768,641 B2
(45) Date of Patent: Sep. 19, 2017

(54) RADIO UNIT WITH A POWER CIRCUIT FOR VOLTAGE SUPPLY AND METHOD FOR OPERATING SUCH A RADIO UNIT

(75) Inventors: Marc Fiedler, Reinach (CH); Ingo Laible, Arlesheim (CH)

(73) Assignee: Endress + Hauser Process Solutions AG, Reinach (CH)

( * ) Notice: Subject to any disclaimer, the term of this patent is extended or adjusted under 35 U.S.C. 154(b) by 766 days.

(21) Appl. No.: 14/117,775

(22) PCT Filed: Apr. 24, 2012

(86) PCT No.: PCT/EP2012/057445
§ 371 (c)(1),
(2), (4) Date: Nov. 14, 2013

(87) PCT Pub. No.: WO2012/163603
PCT Pub. Date: Dec. 6, 2012

(65) Prior Publication Data
US 2014/0070609 A1    Mar. 13, 2014

(30) Foreign Application Priority Data

May 30, 2011    (DE) .................. 10 2011 076 708

(51) Int. Cl.
*H02J 9/06*       (2006.01)
*G05B 19/41*      (2006.01)
*G05B 19/418*     (2006.01)

(52) U.S. Cl.
CPC .......... *H02J 9/061* (2013.01); *G05B 19/4185* (2013.01); *G05B 2219/25282* (2013.01); *Y02P 90/18* (2015.11); *Y10T 307/328* (2015.04)

(58) Field of Classification Search
CPC ... H02J 9/061; G05B 19/4185; G05B 19/042; G05B 19/0423; G05B 2219/25282; Y10T 307/328; Y02P 90/18
See application file for complete search history.

(56) References Cited

U.S. PATENT DOCUMENTS 8,310,088 B2    11/2012   Kah et al.
2005/0245291 A1*  11/2005  Brown ............... G05B 19/4185
                                                  455/572

(Continued)

FOREIGN PATENT DOCUMENTS

DE    102004020393 A1    11/2005
EP         2202598 A2     6/2010
WO    2012163603 A1    12/2012

OTHER PUBLICATIONS

English translation of IPR, WIPO, Geneva, Dec. 12, 2013.
(Continued)

*Primary Examiner* — Jared Fureman
*Assistant Examiner* — James Evans
(74) *Attorney, Agent, or Firm* — Bacon & Thomas, PLLC (57) ABSTRACT

A radio unit for a plant of process automation technology. The radio unit has a power circuit, which serves to derive first and second supply voltages from a voltage source, wherein the power circuit has a first output, via which the first supply voltage is tappable to serve for driving an operating electronics of the radio unit, wherein the power circuit has at least a second output, via which the at least a second supply voltage is tappable to serve for driving at least one field device connectable to the second output.

11 Claims, 4 Drawing Sheets

(56) References Cited

U.S. PATENT DOCUMENTS

| | | |
|---|---|---|
| 2005/0265269 A1 | 12/2005 | Saito et al. |
| 2008/0031520 A1* | 2/2008 | Hou .................... H02H 1/0015 |
| | | 382/168 |
| 2008/0211664 A1 | 9/2008 | Griech et al. |
| 2009/0146502 A1 | 6/2009 | Sinreich |
| 2010/0133899 A1* | 6/2010 | Joegel ................ G05B 19/0423 |
| | | 307/1 |
| 2011/0131455 A1* | 6/2011 | Law ....................... H04B 3/548 |
| | | 714/40 |

OTHER PUBLICATIONS

Mar. 1, 2012 German Search Report, German Patent Office, Munich, Germany.
Aug. 8, 2012 International Search Report, EPO, The Netherlands.
Aug. 2, 2012 International Search Report, EPO, The Netherlands.

* cited by examiner

Fig. 1

(prior art)

RADIO UNIT WITH A POWER CIRCUIT FOR VOLTAGE SUPPLY AND METHOD FOR OPERATING SUCH A RADIO UNIT

TECHNICAL FIELD

The invention relates to a radio unit for a plant of process automation technology. The invention relates, furthermore, to an arrangement comprising such a radio unit and at least one field device. The invention relates, also, to a method for operating such a radio unit, respectively such an arrangement, especially in a plant of process automation.

BACKGROUND DISCUSSION

Known from the state of the art, for example, from WO 03/023536 A1, WO 2009/060000 A1, WO 2009/063053 A1 and EP 0940738 A2, is to use radio units in plants of process automation technology for easier servicing of field devices. There are solutions, in the case of which the field devices have integrated radio units. It is, however, also known to retrofit field devices with radio units, so that the field devices can then be serviced wirelessly.

Energy supply of the field devices as well as also the radio units occurs, in such case, for example, via an electrical current loop, to which one or more field devices and/or one or more radio units are connected. These electrical current loops involve, in such case, as regards hardware, two- or multiconductor arrangements. The supply of the electrical current loop with electrical energy occurs, for example, via a feeding device, such as, for example, a power supply, which delivers the electrical voltage required for establishing an electrical current value in the electrical current loop. If the electrical energy present in the electrical current loop is not sufficient to supply all field devices connected to the electrical current loop, it is also possible to provide separate voltage supplies via additional feeding devices for the individual field devices, respectively the individual radio units. To this end, it is, for example, known from the state of the art, for example, as represented by DE 102004020393 A1, to integrate a battery into the radio unit, so that the radio unit does not need to be supplied with electrical energy via the electrical current loop.

In industrial plants, consequently, due to the large number of installed field devices, often a number of feeding devices are required, in order, on the one hand, to assure communication via the electrical current loop and, on the other hand, to assure operational capability of the field devices connected thereto.

Known from the state of the art are, moreover, fieldbus systems, such as, for example, the HART® protocol in so-called multidrop operation, in which a number of field devices are connected, for example, with one another, via the aforementioned electrical current loop. Additionally, such fieldbus systems can make use of a radio unit, which is integrated in the bus system, in order to service the field devices connected to the bus system or to transmit their measurement data. Such installations are, in given cases, arranged remotely from the operating personnel, so that servicing and/or measured value transmission occurs preferably via the radio unit. However, exactly a long distance transmission of radio signals, for example, via GSM or similar standard known for mobile radio communication, is energy intensive, so that such radio units require a special energy supply.

SUMMARY OF THE INVENTION

An object of the present invention, thus, is to facilitate the supplying of such a plant with electrical energy.

The object is achieved according to the invention by a radio unit for a plant of process automation technology with a power circuit, which serves to derive first and second supply voltages from a voltage source, wherein the power circuit has a first output, via which the first supply voltage is tappable to serve for driving an operating electronics of the radio unit, wherein the power circuit has at least a second output, via which the at least a second supply voltage is tappable to serve for driving at least one field device connectable to the second output.

It is thus an idea of the present invention to embody a radio unit in such a manner that a power circuit integrated in the radio unit serves not only for supplying the radio unit with electrical energy, but also for supplying, for example, at least one thereto connected field device with electrical energy. The field device can, in such case, be connected with the radio unit, respectively the power circuit, more exactly the second output of the power circuit, via a two conductor, electrical current loop—electrical current loop for short. Instead of connecting a field device directly with this second output, also a number of field devices can be connected in parallel to a two conductor, electrical current loop, which is connected to the second output, and be supplied with energy from the two conductor, electrical current loop. By means of the second supply voltage output by the power circuit, then an electrical current value can be set in the electrical current loop by means of one of the connected devices. The electrical current value can be, for example, a 4-20 mA electrical current signal and/or an electrical current signal corresponding to the HART protocol.

Furthermore, the first and second supply voltages can have different values.

The proposed radio unit includes, for example, a housing, in which both the operating electronics of the radio unit, i.e. the electrical and/or electronic components serving for the functioning of the radio unit, as well as also the power circuit are integrated. The power circuit of the radio unit includes additionally at least two outputs, wherein tappable via the first output is the first supply voltage, which serves for driving the operating electronics of the radio unit, and via the second output the second supply voltage, which serves, for example, for driving at least one or more field devices or for feeding a fieldbus system, such as the above-mentioned electrical current loop. Furthermore, for example, connection terminals can be provided on the housing of the radio unit for connecting the fieldbus system, such being especially a two conductor, electrical current loop. Preferably, connection terminals can be provided as in a universal interface, such as disclosed in German laid open application DE 102008036967 A1.

The voltage source can be, for example, a grid voltage, which is fed by an energy supplier into an electrical current- or voltage grid. By means of the power circuit, the first, respectively the second, supply voltage can be derived from this grid voltage. However, instead of a grid voltage, any other source of electrical energy can serve as voltage source.

In a form of embodiment of the radio unit, an energy storer is provided, which serves in the case of an interruption of a voltage supply from the voltage source, to maintain and to derive from the energy storer, at least for a time, the first supply voltage, which serves for driving the operating electronics.

The energy storer can be an energy storer with limited capacitance, such as, for example, a single-use battery or a rechargeable battery. For the case, in which the voltage supply from the voltage source is lost, then the energy supply of the radio unit can be assured by using electrical energy from this energy storer for producing the first supply voltage, which serves for driving the operating electronics of the radio unit.

In an additional form of embodiment of the radio unit, the power circuit is so designed that the first supply voltage assumes a first, essentially constant value, when the first supply voltage is derived from the voltage source, and that the first supply voltage assumes a second, essentially constant value, when the first supply voltage is derived from the energy storer.

Through different values of the first supply voltage, the current state, for example, of the energy supply, respectively the energy source, can be signaled to the operating electronics of the radio unit via the value of the first supply voltage. For such purpose, a first value of the supply voltage can serve to indicate a first operating state, and a second value of the first supply voltage can serve to indicate a second operating state. The first and second values of the first supply voltage are, in such case, so chosen that the operating electronics of the radio unit can be supplied with electrical energy and/or operated in at least one operating mode. Preferably, the operating electronics is operated in an energy saving mode in the case, in which the first supply voltage is derived from the energy storer. The energy saving mode has, compared with the operating mode of the operating electronics of the radio unit, when the operating electronics of the radio unit is operated with electrical energy from the voltage source, a lesser power- and/or energy consumption. In this way, also a lesser value of the first supply voltage can suffice for driving the operating electronics.

In an additional form of embodiment of the radio unit, the first and second values of the first supply voltage are both tappable via the first output of the power circuit and differ from one another.

For detecting the value of the first supply voltage, a detection circuit can be part of the operating electronics or be connected with the operating electronics. Preferably, the difference between the first and second supply voltages amounts to less than 5 V, respectively 3 V, and preferably less than 2 V and especially preferably less than 1 V. Alternatively, the difference between the first and second supply voltages can be at least 1 V, preferably at least 2 V and especially preferably at least 3 V, respectively 5 V.

Furthermore, in the case, in which the first supply voltage changes from the first value to the second value or from the second value to the first value, the operating mode of the operating electronics can be correspondingly changed by adapting, i.e. reducing or increasing, the power-, respectively energy, requirement of the operating electronics.

In an additional form of embodiment of the radio unit, the power circuit is so embodied that, upon interruption of the voltage supply via the voltage source, no second supply voltage is tappable at the second output of the power circuit. In such case, the supplying of the at least one field device connected via the second output of the power circuit can be automatically interrupted.

The interruption of the voltage supply from the voltage source can, thus, be utilized for determining the presence of a malfunction, i.e. a disturbance, for example, in the communication with one or more field devices, since via the power circuit integrated in the radio module it is now possible to distinguished between a failure of the voltage supply due to a failure of the voltage source or due some other malfunction, such as, for example, a cable break of a connection to the one or more field devices. This can then be signaled to the radio unit, for example, supplementally via the different values of the first supply voltage.

In an additional form of embodiment of the radio unit, the power circuit is so embodied that, upon interruption of the voltage supply via the voltage source, a supply voltage is still tappable at the first output of the power circuit. This supply voltage can be derived from the energy scorer. In the case of an interruption of the voltage supply via the voltage source, thus, the supplying, i.e. the supplying with electrical energy, of the operating electronics of the radio unit can still be assured. In this way, for example, the communication by means of the radio unit in the case of a failure of the energy supply from the voltage source can be assured, at least for a time.

In an additional form of embodiment of the radio unit, the operating electronics of the radio unit includes a communication interface, which serves for wired communication with the at least one field device connectable to the radio unit.

Via this communication unit, the radio unit can communicate with the at least one field device or, in given cases, with the plurality of field devices, for example, via a fieldbus system. The field device, respectively the field devices, connected to the fieldbus system can then be serviced, especially parametered, wirelessly via the radio unit. Furthermore, measured values of one or more of the field devices connected to the radio unit can be transmitted via the radio unit.

In an additional form of embodiment of the radio unit, in the case, in which voltage supply via the voltage source is interrupted, a corresponding radio signal is emitted via a wireless communication interface of the radio unit.

To this end, electrical energy can be drawn from the energy storer, which, for example, is likewise integrated into the radio unit, i.e. is arranged within the housing of the radio unit. A trigger for the emission, i.e. transmitting, of the radio signal can be the switching from the first value of the first supply voltage on the second value of the first supply voltage, respectively the switching from the second value of the first supply voltage to the first value of the first supply voltage, since these indicate, respectively, the interruption and the presence of the voltage supply from the voltage source. The above-mentioned detection circuit can be used for detecting the value of the first supply voltage.

In an additional form of embodiment of the radio unit, the radio signal contains diagnostic information displaying failure, respectively presence, of the voltage supply.

In an additional form of embodiment of the radio unit, galvanic isolation is present between the first output and the at least a second output of the power circuit. In this way, the electrical circuit for the field device can be safely isolated from the electrical circuit for the operating electronics of the radio unit and between Ex- and non-Ex regions. This is required, for example, in the case of an electrical current loop in an Ex-region, wherein the electrical current loop is driven by means of the second supply voltage.

In an additional form of embodiment of the radio unit, the voltage source is a voltage grid. As already mentioned, such voltage grids are provided by energy suppliers, for example, in order to transmit the so-called grid voltage.

The object is furthermore achieved, by an arrangement comprising a radio unit according to at least one of the preceding forms of embodiment and at least one field device, wherein the at least one field device is fed with energy exclusively via the at least a second connection of the power circuit of the radio unit.

In this way, a separate voltage supply, i.e., for example, a supplemental measurement transmitter supply device, is no longer required for driving the field device. Today, for example, radio units for field devices are produced, which enable a long distance transmission of radio signals, for example, via the GSM (Global System for Mobile communications) or other wireless communication standards. Such radio units require, however, for emitting, i.e. transmitting, the radio signals more energy than can be made available, for example, via a 4-20 mA electrical current loop and require, consequently, an additional energy supply. The proposed radio unit only requires one power circuit for supply of the radio unit, respectively the operating electronics of the radio unit, and one or more field devices connected to the radio unit. The first output of the power circuit provides, in such case, furthermore, the first supply voltage for the operating electronics of the radio unit.

The second output of the power circuit can be connected with the at least one field device or with a plurality of field devices, for example, via a universal interface for a wireless adapter, such known from DE 102008036967 A1, for example, via an electrical current loop. A radio unit can for this purpose thus have a power circuit according to one of the proposed forms of embodiment and a universal interface with five connection terminals, such as shown in DE 102008036967 A1. Connected to this universal interface, for example, via an electrical current loop or a bus system, can be a field device or a number of field devices. The universal interface of the radio unit can, in such case, be connected with the supply unit via the second and fourth connection terminals of the universal interface. Furthermore, the fourth connection terminal can be executed doubly and be connected to the fourth connection terminal and the fifth connection terminal of the two conductor, electrical current loop. As described in DE 102008036967 A1, the second connection terminal can be a communication terminal, via which, for example, a communication resistor, which serves, for example, for communication according to the HART protocol, is connectable. Furthermore, the fourth connection terminal is another communication terminal and the fifth connection terminal a high-resistance ground connection. Through such contacting between field device and radio unit via the universal interface, also a number of field devices can be supplied and addressed by means of the radio unit. Furthermore, the proposed connecting of the communication resistor of the radio unit can be utilized, in order to communicate via the two conductor, electrical current loop.

The aforementioned circuitry provides that the power circuit, respectively the second output of the power circuit, is connected in series with the communication resistor of the radio unit and in parallel with a HART modem, which is, for example, part of the operating electronics of the radio unit. The proposed circuitry can, on the one hand, assure the supply of the electrical current loop with electrical energy, i.e. with voltage, via the internal power circuit and, on the other hand, drive the radio unit in the form of a HART modem. Thus, the radio unit can communicate, for example, in HART multidrop operation, with a plurality of field devices, without using, in such case, for example, a communication resistor present outside the radio unit.

The object is also achieved by a method for operating a radio unit for a plant of process automation, wherein the radio unit has a power circuit, by which an operating electronics of the radio unit is supplied with a first supply voltage and a field device connected to the radio unit with a second supply voltage, wherein the first and second supply voltages are derived from a voltage source and the first supply voltage is tapped via a first connection of the power circuit and the second supply voltage via a second connection of the power circuit.

The forms of embodiment and advantages thereof relative to the radio unit and the arrangement apply analogously to the method.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
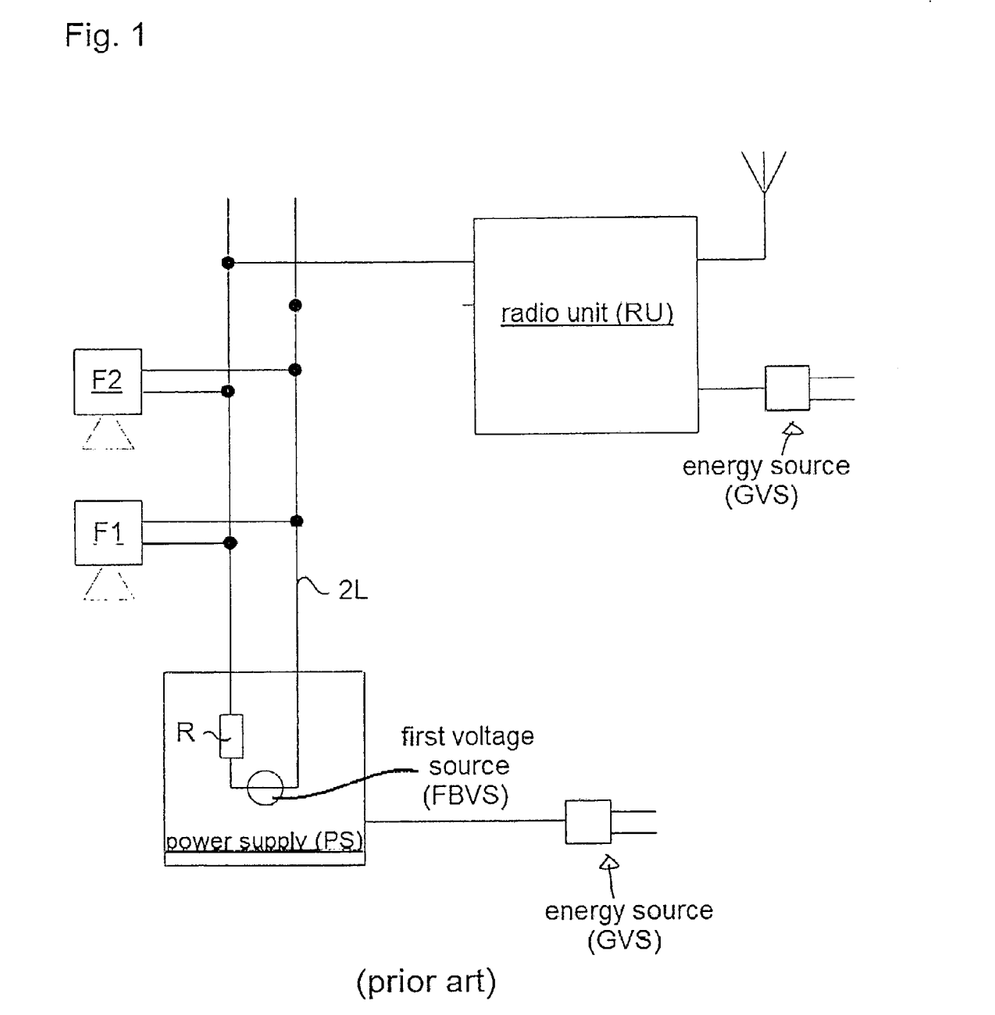
FIG. 1 is a schematic representation of an arrangement of field devices in a plant of process automation technology according to the state of the art.

FIG. 1 shows a schematic representation of a two conductor, electrical current loop 2L, to which a number of field devices F1, F2 as well as a radio unit RU are connected. The field devices F1, F2 as well as also the radio unit RU are, in such case, connected in parallel on the electrical current loop 2L. The electrical current loop 2L is, in such case, fed by a power supply PS connected to the electrical current loop and containing a first voltage source FBVS. The voltage source FBVS is, in such case, supplied by an energy source GVS with electrical energy, for example, from a voltage grid. The voltage source FBVS is connected in series in the electrical current loop 2L.

In order to enable especially digital communication via the electrical current loop, the power supply PS includes supplementally a communication resistor R. Communication resistor R serves to avoid a short circuiting of, for example, HART® signals via the first voltage source FBVS. The field devices can be operated, for example, according to the HART® protocol in so-called multidrop operation and communication via the electrical current loop 2L. For example, the radio unit can also produce HART® modem integrated into the radio unit.

The field devices F1, F2 of FIG. 1 are supplied with electrical energy from the electrical current loop 2L. To this end, there is in the electrical current loop 2L always a minimum electrical current, respectively a minimum voltage. In the so-called HART® multidrop operation, for example, always present in the electrical current loop is 4 mA, by means of which all devices connected to the electrical current loop must be operated.

The radio unit RU connected to the electrical current loop 2L can, in contrast, have its own voltage supply, for example, by means of a single-use battery integrated into the radio unit, so that no electrical energy needs to be removed from the electrical current loop 2L for driving the radio unit RU. In FIG. 1, the radio unit RU is, however, supplied with electrical energy by an energy source in the form of a grid connection GVS. The operating electronics of the radio unit RU is driven with energy from this voltage supply. For such purpose, a first supply voltage is provided from the voltage supply GVS.

For driving the field devices F1, F2, respectively for setting the electrical current in, respectively the voltage across, the electrical current loop 2L, a second supply voltage is provided by the voltage source FBVS, i.e. the second supply voltage is derived from the voltage source.

Thus, there is in the electrical current loop 2L, supplementally to the communication resistor R of the power supply PS, either a communication resistor in the radio unit RU, or the radio unit RU utilizes for communication the communication resistor R remotely present in the power supply PS. There are, however, also power supplies PS known that do not have an integrated communication resistor R.

Figure 2:
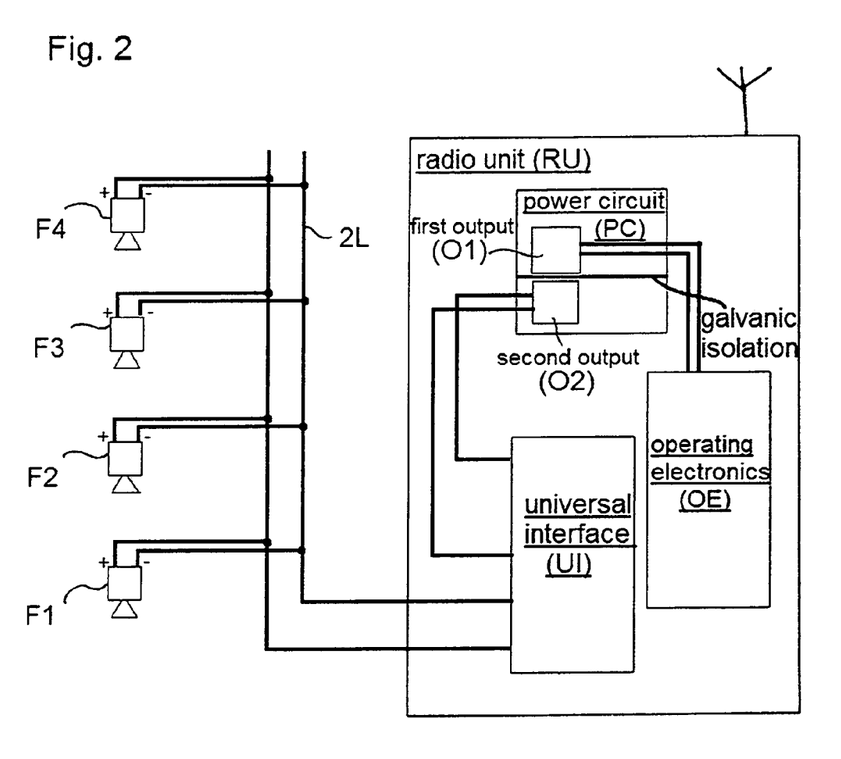
FIG. 2 is a schematic representation of a radio unit and a corresponding arrangement according to a form of embodiment of the invention.

FIG. 2 shows a form of embodiment of an arrangement according to the invention comprising a number of field devices F1, F2, F3, F4 and a radio unit RU with a power circuit PC.

The power circuit PC includes two outputs O1, O2, wherein the first output O1 provides a first supply voltage for driving the operating electronics OE of the radio unit RU and the second output O2 provides a second supply voltage for driving the electrical current loop 2L and the field devices F1, F2, F3, F4 connected thereto. Additionally to the outputs O1, O2 shown in FIG. 2, also other outputs can be provided, at which other supply voltages can be tapped.

Alternatively, the second output O2 or a further output of the power circuit PC can serve for the direct connection of a field device to the radio unit RU.

Since the power circuit PC is arranged in the radio unit RU and, thus, just one connection to the electrical current loop 2L is present, such as, for example, a communication interface for communication via the electrical current loop 2L, the total load in the electrical current loop 2L can be lessened.

Figure 3:
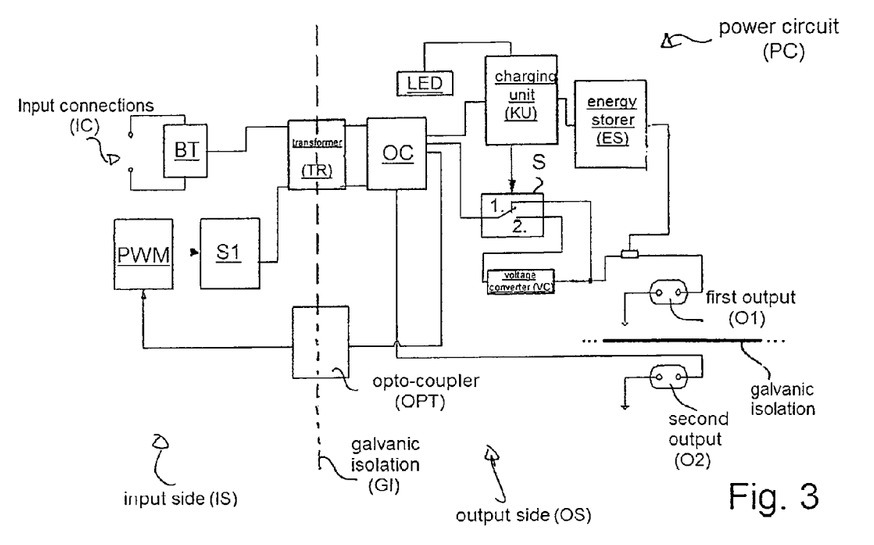
FIG. 3 is a schematic representation of the construction of a radio unit according to a form of embodiment of the invention.

FIG. 3 shows a schematic construction according to a form of embodiment of a proposed radio unit RU.

The radio unit RU, and, thus, the included power circuit PC, is connectable to a voltage source (not shown) via input connections IC. The voltage source can be, for example, an alternating voltage source. Thus, for example, a rectifier RT is connected with the input connections IC, in order to convert the alternating voltage into a direct voltage.

Furthermore, the power circuit PC includes two outputs O1, O2, via which the first and second supply voltages can be tapped. The first supply voltage serves, in such case, for driving the operating electronics OE and the second supply voltage for driving a field device connectable to the radio unit or for driving a bus system such as, for example, a HART bus system.

Provided at the second output O2 can be, for example, a second supply voltage of 24 V, and at the first output O1 a first or a second value of the first supply voltage of, for example, 10 V, 11 V or 12 V, for driving the operating electronics OE. The first supply voltage can, accordingly, assume different values. As a function of these different values, the operating electronics OE of the radio unit RU, respectively the radio unit itself, is switched to different operating modes or transmits one or more radio signals.

Serving for charging the energy storer ES can be a corresponding charging unit KU. Additionally, for signaling the different states, such as, for example, "energy storer ES is charging", "energy storer ES is discharging" or "energy storer ES is full", etc., a signaling system LED, such as, for example, a light emitting diode, can be used, which is, for example, likewise connected to the charging unit KU.

In defect free operation, switch S is in position 1, so that the first supply voltage output by the transformer TR and amounting, for example, to 12 V is sent directly to the first output O1. Upon interruption of the supply from the voltage source, the energy storer ES discharges and provides, for example, 10 V at the first output O1. In the case, in which the energy storer is charging, switch S transfers to position 2, and a third supply voltage of, for example, 11 V is provided at the first output O1. For limiting the voltage, a voltage converter VC can be provided.

The power circuit PC according to the example of an embodiment in FIG. 3 includes, furthermore, galvanic isolation GI between input side IS and output side OS. To this end, the power circuit PC includes a transformer TR and an optocoupler OPT. Furthermore, for example, a control unit for pulse width modulation PWM for transmission of energy across the galvanic isolation GI can be provided. There are, however, also other methods possible for transmission of energy across a galvanic isolation GI.

Figure 4:
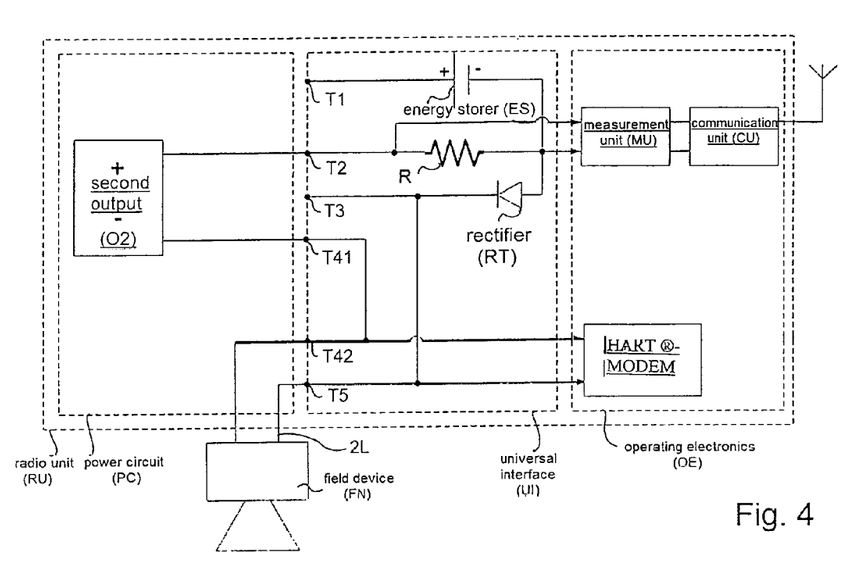
FIG. 4 is a schematic representation of a combination of a power circuit and a universal interface of a radio unit with a field device according to an additional form of embodiment of the invention.

FIG. 4 shows a schematic representation of an assembly comprising the second output O2 of the power circuit PC, a universal interface UI such as known from DE 102008036967 A1, as well as a part of the operating electronics OE of a radio unit RU and a field device FN connected to the universal interface.

The universal interface UI has five connection terminals T1, T2, T3, T41, T42, T5, wherein the fourth connection terminal T41, T42 is present in the form of two terminals, which are connected with one another.

The second output O2 of the power circuit PC is connected by means of the universal interface UI via the second connection terminal T2 and a communication resistor R with the fifth connection terminal T5. The field device FN is connected via this fifth connection terminal T5 and a first instance T41 of the fourth connection terminal with the universal interface UI of the radio unit RU.

The second output O2 of the power circuit PC is connected with the universal interface UI via a second instance T42 of the fourth connection terminal and the second connection terminal T2.

The proposed arrangement and/or assembly enables one or more field devices F1, . . . , FN to be connected to the radio unit RU via the HART modem of the radio unit RU, so that communication via the electrical current loop 2L occurs, for example, according to the HART protocol via the HART modem of the radio unit RU.

Instead of directly connecting a field device FN to the connection terminals four T42 and five T5 of the radio unit RU, an electrical current loop 2L can be connected to these terminals, so that a plurality of field devices F1, . . . , F4 can then be addressed via such electrical current loop 2L.

Further according to FIG. 4, a measuring unit MU is provided for determining the voltage, respectively the second supply voltage, output into the electrical current loop 2L, respectively output by the second output O2 of the power circuit PC. This measuring unit MU enables, for example, detection of whether a predetermined electrical current- and/or voltage value is present in the electrical current loop 2L.

The operating electronics OE can furthermore have a communication unit CU, which serves for transmitting and/or receiving radio signals.

The invention claimed is:

1. A radio unit for a plant of process automation technology, comprising: a voltage source; operating electronics; a power circuit, which serves to derive first and second supply voltages from said voltage source, wherein: said power circuit has a first output, via which said first supply voltage is tappable to serve for driving said operating electronics of the radio unit; said power circuit has at least a second output, via which the second supply voltage is tappable to serve for driving at least one field device connectable to the second output; and said power circuit is so embodied that, upon interruption of a voltage supply via-said voltage source, a second value of the first supply voltage is still tappable at the first output of said power circuit.

2. The radio unit as claimed in claim 1, further comprising: an energy storer, which serves in the case of an interruption of the voltage supply by said voltage source to maintain and to derive from said energy storer, at least at times, the first supply voltage, which serves for driving said operating electronics.

3. The radio unit as claimed in claim 2, wherein:

said power circuit is so designed that the first supply voltage assumes a first, essentially constant value, when the first supply voltage is derived from said voltage source, and that the first supply voltage assumes a second, essentially constant value, when the first supply voltage is derived from said energy storer.

4. The radio unit as claimed in claim 3, wherein:

the first and second values of the first supply voltage are both tappable via the first output and differ from one another.

5. The radio unit as claimed in claim 1, wherein:

said operating electronics includes a communication interface, which serves for wired communication with the at least one field device connectable to the radio unit.

6. The radio unit as claimed in claim 1, wherein:

galvanic isolation is present between the first output and at least a second output of said power circuit.

7. The radio unit as claimed in claim 1, wherein:

said voltage source is a voltage grid.

8. An arrangement comprising:

a radio unit as claimed in claim 1 and at least one field device, wherein:

said at least one field device is fed with energy exclusively via the at least a second connection of said power circuit of the radio unit.

9. A method for operating a radio unit for a plant of process automation, wherein the radio unit has a power circuit, by which an operating electronics of the radio unit is supplied with a first supply voltage and a field device connected to the radio unit is supplied with a second supply voltage, the method comprising the steps of:

deriving the first and second supply voltages from a voltage source;

the first supply voltage is tapped via a first connection of the power circuit and the second supply voltage is tapped via a second connection of the power circuit: and embodying said power circuit so that, upon interruption of a voltage supply via said voltage source, a second value of the first supply voltage is still tappable at the first output of said power circuit.

10. A radio unit for a plant of process automation technology, comprising: a voltage source; operating electronics; and a power circuit, which serves to derive first and second supply voltages from said voltage source, wherein: said power circuit has a first output, via which said first supply voltage is tappable to serve for driving said operating electronics of the radio unit; said power circuit has at least a second output, via which the second supply voltage is tappable to serve for driving at least one field device connectable to the second output; when a voltage supply via said voltage source is interrupted, a corresponding radio signal is emitted via a wireless communication interface of the radio unit; and said power circuit is so embodied that, upon interruption of said voltage supply via said voltage source, a second value of the first supply voltage is still tappable at the first output of said power circuit.

11. The radio unit as claimed in claim 10, wherein:

the radio signal contains diagnostic information displaying failure of said voltage supply.

* * * * *